United States Patent [19]

Kaye

[11] Patent Number: 4,617,670

[45] Date of Patent: Oct. 14, 1986

[54] AERODYNAMIC WINDOWS FOR HIGH POWER LASERS

[75] Inventor: Alan S. Kaye, Wantage, England

[73] Assignee: United Kingdom Atomic Energy Authority, London, England

[21] Appl. No.: 710,064

[22] Filed: Mar. 11, 1985

[30] Foreign Application Priority Data

Mar. 26, 1984 [GB] United Kingdom ............... 8407754

[51] Int. Cl.⁴ .............................................. H01S 3/08
[52] U.S. Cl. .................................. 372/104; 372/103; 350/319
[58] Field of Search ................... 372/104, 103, 95, 98, 372/99; 350/319

[56] References Cited

U.S. PATENT DOCUMENTS 3,851,273 11/1974 Hoag et al. ...................... 372/104
4,402,574 9/1983 McConnel ......................... 350/319
4,520,486 5/1985 Lavarini ............................ 372/99

Primary Examiner—Leon Scott, Jr.
Attorney, Agent, or Firm—William R. Hinds

[57] ABSTRACT

An aerodynamic window for a gas laser, comprising a chamber positioned at one end of a structure forming part of a laser cavity in which lasing action can take place the chamber having first and second apertures aligned with the optical axis of the laser cavity and its longitudinal axis at an acute angle to the optical axis of the optical cavity and means whereby the chamber can be continuously evacuated, wherein the chamber is of uniform cross section and the apertures are situated in a side wall and an end wall of the chamber respectively.

Preferably, the second aperture is displaced from the longitudinal axis of the chamber towards the first aperture.

4 Claims, 3 Drawing Figures

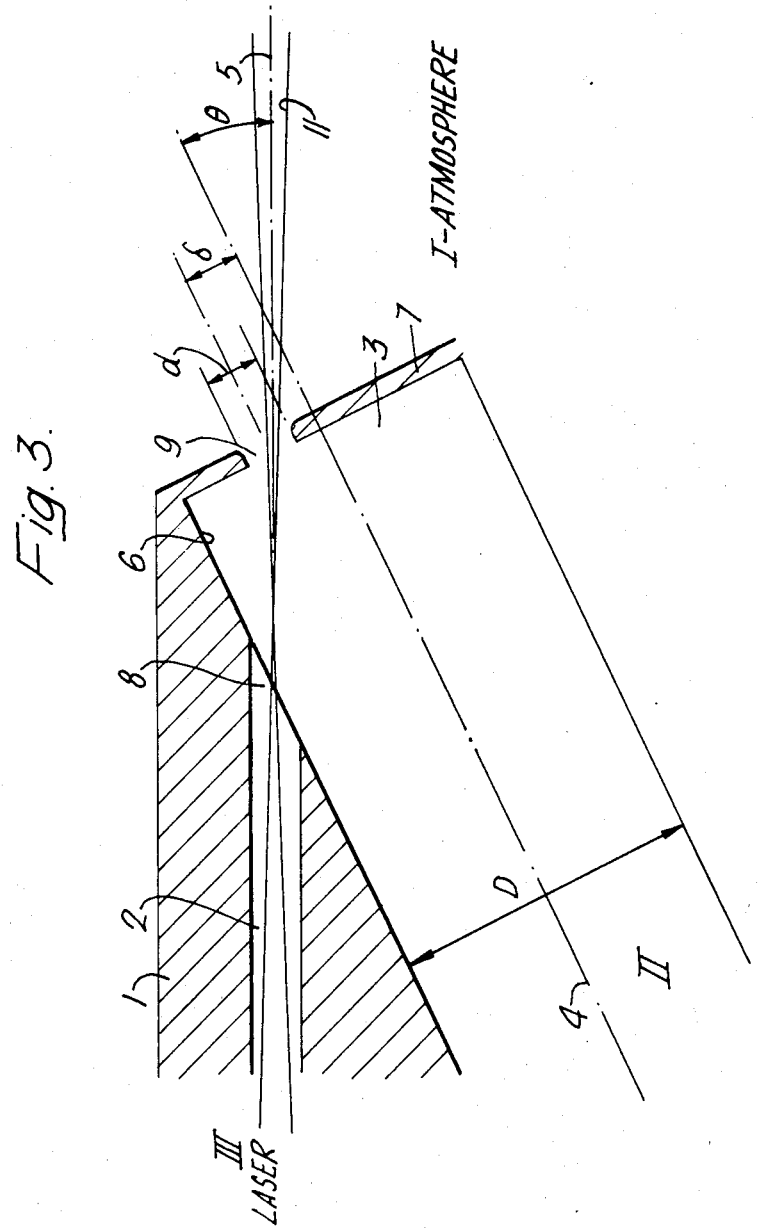

AERODYNAMIC WINDOWS FOR HIGH POWER LASERS

The present invention relates to aerodynamic windows for high power gas lasers which operate at pressures below that of the atmosphere. In order to extract the output beam from such a laser, an output window has to be incorporated into the chamber containing the lasing medium. With lasers giving mean powers in the kilowatt range or above, solid transmitting windows become impracticable due to thermal distortion, and ultimately, failure, as a result of the power absorbed by the windows.

A solution to the problem is to use so-called aerodynamic windows in which the solid window material is replaced by a curtain of some gaseous material moving at speed sufficient for its momentum to be able to withstand the pressure difference between that of the gaseous lasing medium in the laser and that of the, surrounding atmosphere. Aerodynamic windows fall into two types, those utilising compressed air, and those utilising differential pumping. The former rely on the strong dependence of static pressure on Mach number in a supersonic gas flow. By exposing the laser side to the static pressure in a high Mach number region of gas flow and the atmospheric side to a low Mach number region of the same flow, large pressure differences can be maintained stably. Typically, these two regions of flow are separated either by a shock wave or a Prandtl-Meyer expansion wave. Such devices are useful particularly when large apertures are required. However, such windows have disadvantages, the two main ones of which are:

(a) The operating pressure achievable within the laser is fixed by the profile of the air flow duct and cannot therefore easily be varied.

(b) The performance of the window is very dependent on the achievement of precisely defined profiles in the high Mach number air flow channel.

Windows which utilise differential pumping also rely on achieving a low static pressure in a high Mach number flow, but in this case the high pressure side is exposed to the atmospheric stagnation pressure of the flowing gas. In its simplest form this type of window consists of a region between aligned inner and outer apertures formed in two plates, which are perpendicular to the direction of the emerging laser beam, which is differentially pumped. Such an arrangement is shown in FIG. 1. Although such windows are simple to make, they too have disadvantages, among the most important of which are:

(a) The optical path length through the turbulent region in the interspace is rather long, which leads to large distortions; and (b) The pressure obtained in the laser chamber is the stagnation pressure in the main gas jet formed in the interspace, not the static pressure, and as a result is higher than is necessary or desirable.

In accordance with the invention, there is provided an aerodynamic window for a gas laser, comprising a chamber positioned at one end of a structure forming part of a laser cavity in which lasing action can take place, the chamber having first and second apertures aligned with the optical axis of the laser cavity and its longitudinal axis at an acute angle to the optical axis of the laser optical cavity, and means whereby the chamber can be continuously evacuated, wherein the chamber is of uniform cross-section and the apertures are situated in a side wall and an end wall of said chamber, respectively.

Preferably, the aperture further from that region of the optical cavity which contains the lasing medium is displaced from the longitudinal axis of the chamber towards the other aperture.

The invention will now be described, by way of example, with reference to the accompanying drawings, in which:

FIG. 3 is a diagrammatic representation of a second embodiment of the invention.

Figure 1:
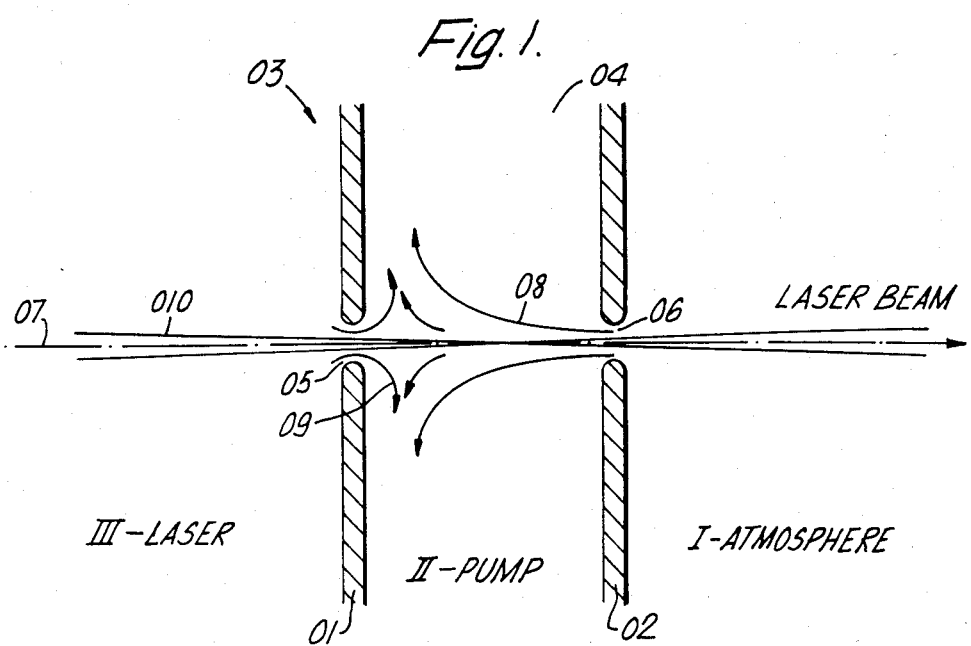
FIG. 1 shows a known form of aerodynamic window for a gas laser.

Referring to FIG. 1, an aerodynamic window for a laser consists of two baffles 01 and 02 which are separated by a space 04. The baffle 01 forms an end wall of a laser cavity 03. The baffles 01, 02 have apertures 05 and 06, respectively. The apertures 05 and 06 are both centered on the optical axis 07 of the laser cavity 03. The space 04 is arranged to be evacuated by a pumping system, which is not shown. The laser cavity 03 forms a low gas pressure region designated III, the atmosphere a high pressure region designed I, and the space 04 a region at an intermediate gas pressure designated II. In use, when the space 04 is pumped out, a high pressure jet 08 of air enters the aperture 06 and travels across the space 04 to impinge on a lower pressure jet 09 of gas emerging from the laser cavity 03, before being diverted to the pumping system. The effect is to prevent an appreciable amount of the lasing gas from leaving the laser cavity 03. Thus a beam of laser energy 010 can leave the laser cavity 03 without having to pass through a solid exit window.

Figure 2:
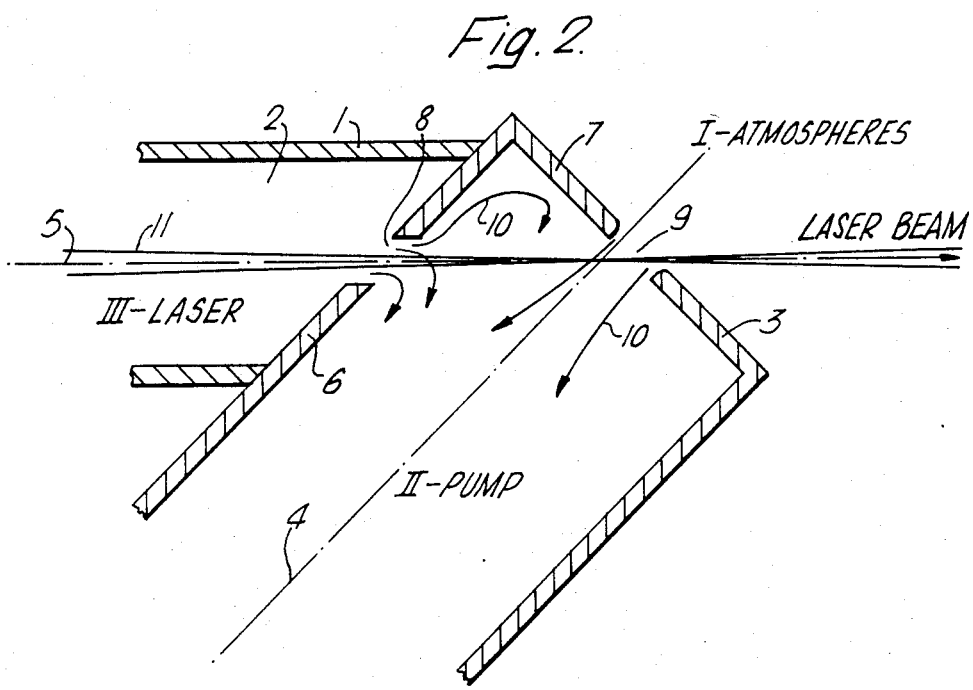
FIG. 2 is a diagrammatic representation of one embodiment of the invention.

FIG. 2 illustrates an embodiment of the invention. Only those parts of the laser which are relevant to the invention are illustrated, because the remainder of the laser can take any of the forms of gas laser which are used in the laser art.

Referring to FIG. 2, a hollow structure 1 forms part of a laser cavity 2 of a gas laser. The structure 1 terminates in a chamber 3 which is arranged to be evacuated by a large capacity pumping system, which is not illustrated. The longitudinal axis 4 of the chamber 3 is inclined at an angle to the optical axis 5 of the laser cavity 2 of the laser. In two contiguous walls 6 and 7 of the chamber 3 are apertures 8 and 9, respectively. The apertures 8 and 9 are both centred on the optical axis 5 of the laser cavity 2. The edges of the aperture 8 are angled so as to be parallel to the optical axis 5 of the laser cavity 2, and those of the aperture 9 are rounded so as to promote a streamline flow of air into the chamber 3 when the pressure in the chamber 3 is reduced to below that of the atmosphere by means of the pumping system. The air flow through the apertures 8 and 9 into the chamber 3 when it is being pumped down is shown by the arrows 10. A beam of laser radiation 11 is shown leaving the laser cavity 2 via the apertures 8 and 9. Comparing FIGS. 1 and 2, it can be seen that the optical path length of the emerging laser beam 11 in the high pressure region of air jet in the chamber 3 is much reduced compared with that of the prior art arrangement shown in FIG. 1. Also, the pressure in the low gas pressure region III within the laser cavity 2 is close to the static pressure in the gas flow in the region of intermediate gas pressure II, so that for a given pumping speed in the chamber 3, a lower gas pressure can be maintained in the region III compared with the corresponding regions of the arrangement of FIG. 1. In practice the pressure within the laser cavity 2 is found to be commensurate with that in the pumping line, by means of which the chamber 3 is evacuated, well downstream of the high pressure gas jet issuing from the aperture 9.

The gas density across the aerodynamic window is not uniform, therefore some distortion of the laser beam 11 occurs. If the pressure in the laser cavity is much less than atmospheric pressure, then the optical thickness t of the window is given by the relation $t \sim 5d(\mu - 1)$ where d is the diameter of the laser beam 11 as it passes through the aerodynamic window and $\mu$ is the refractive index of air. For a non-uniformity over the apertures 8 and 9 of $0.25\lambda$ where $\lambda$ is the wavelength of the radiation in the laser beam II, it is required that $d \leq 200\lambda$. For a carbon dioxide laser operating at $10.6\mu$, this gives a beam diameter of $\leq 2$ mm. which is achieved easily in practice.

A second embodiment of the invention is shown in FIG. 3 in which those items which correspond to similar items in the first embodiment of the invention have the same reference numerals. The aperture 9 is displaced from the centre line 5 of the chamber 3 towards the aperture 8. This has two effects.

Firstly, the pumping speed required to reach a given equilibrium gas pressure in the chamber 3 is reduced because the internal gas flow in the region of the apertures 8 and 9 produces a region of very low static pressure on the wall 6 of the chamber 3 in the vicinity of the aperture 8. In general, the greater the offset, designated $\delta$ in FIG. 3, the lower the pumping speed required to attain a given pressure in the vicinity of the aperture 8. However, the aperture 8 needs to be elongated to maintain a clear passage for the laser beam 11, and ultimately this causes the gas flow pattern to be altered, which negates the favourable effect. An optimum effect is obtained when the aperture 9 is offset from the centre line 5 of the chamber 3 by a distance approximately equal to 0.2 D where D is the width of the chamber 3, and the angle between the optical axis 4 of the laser cavity 2 and the centre line 5 of the chamber 3 is approximately 25°, as indicated in FIG. 3.

Secondly, the pressure within the laser cavity 2 is more sensitive to the bleed rate of laser gas into the chamber 3 due to the changed nature of the interaction between the laser gas issuing from the aperture 8 and the main jet of air issuing from the aperture 9. For example, a laser operating pressure of 50 m bar can be maintained with a pumping speed for the chamber 3 of 5500 l/min, compared with the 8000 l/min required for an arrangement with the same dimensions for the laser cavity 2, chamber 3 and apertures 8 and 9 but with the aperture 9 in the centre of the wall 7.

I claim:

1. An aerodynamic window for a gas laser, comprising a chamber positioned at one end of a structure forming part of a laser cavity in which lasing action can take place, the chamber having first and second apertures aligned with the optical axis of the laser cavity and the longitudinal axis of the chamber at an acute angle to the optical axis of the laser optical cavity, and for permitting the chamber to be continuously evacuated such that an intermediate pressure is established in said chamber relative to a lower pressure in said laser cavity and a higher pressure outside of said chamber, wherein the chamber is of uniform cross-section and the apertures are situated in a side wall and an end wall of said chamber, respectively thereby providing an aerodynamic window.

2. An aerodynamic window according to claim 1 wherein the second aperture is offset from the longitudinal axis of the chamber towards the first aperture.

3. An aerodynamic window according to claim 1 wherein the longitudinal axis of the chamber is inclined to the optical axis of the laser cavity at an angle of approximately twenty five degrees.

4. An aerodynamic window according to claim 2 wherein the offset of the second aperture is approximately equal to 0.2D where D is the width of the chamber.

* * * * *